(12) United States Patent
Smith et al.

(10) Patent No.: US 8,166,447 B1
(45) Date of Patent: Apr. 24, 2012

(54) POWER DELIVERY NETWORK CALCULATOR TOOL FOR PRINTED CIRCUIT BOARD CAPACITORS

(75) Inventors: Lawrence David Smith, San Jose, CA (US); Quoc Cuong D. Nguyen, San Jose, CA (US); Ravindra Reddy Gali, San Jose, CA (US)

(73) Assignee: Altera Corporation, San Jose, CA (US)

( * ) Notice: Subject to any disclaimer, the term of this patent is extended or adjusted under 35 U.S.C. 154(b) by 462 days.

(21) Appl. No.: 12/365,380

(22) Filed: Feb. 4, 2009

(51) Int. Cl.
 *G06F 17/50* (2006.01)
(52) U.S. Cl. .................................. 716/136; 716/132
(58) Field of Classification Search ........... 716/132–136
 See application file for complete search history.

(56) References Cited

U.S. PATENT DOCUMENTS

| | | | |
|---|---|---|---|
| 6,789,241 B2 * | 9/2004 | Anderson et al. | 716/115 |
| 6,937,971 B1 * | 8/2005 | Smith et al. | 703/18 |
| 6,981,230 B1 * | 12/2005 | Lin et al. | 716/115 |

* cited by examiner

*Primary Examiner* — Jack Chiang
*Assistant Examiner* — Binh Tat
(74) *Attorney, Agent, or Firm* — Womble Carlyle Sandridge & Rice LLP

(57) ABSTRACT

A method of calculating a system power distribution network impedance is presented. The impedance calculation calculates the impedance as separate elements of the printed circuit board (PCB). An approximation of the power and ground via inductance of the printed circuit board is made based on the configuration of the printed circuit board. The decoupling capacitors of the PCB are modeled as a parallel combination of inductors, capacitors, and resistors, and the parallel combination is used to calculate the impedance. In addition to the impedance associated with the decoupling capacitors, the method calculates an inductance associated with a mounting orientation of the decoupling capacitors. The power and ground planes of the printed circuit board have an associated capacitance and inductance, which is calculated. The resultant simulated impedance profile illustrating the board configuration impedance over a frequency range is displayed.

17 Claims, 11 Drawing Sheets

| Library | | | | | | | | | | | | | Save | Restore Custom | Restore Default |
|---|---|---|---|---|---|---|---|---|---|---|---|---|---|---|---|
| Decoupling Cap | 0201 | | 0402 | | 0603 | | 0805 | | 1206 | | Custom | | | | |
| | ESR(Ω) | ESL(nH) | ESR(Ω) | ESL(nH) | ESR(Ω) | ESL(nH) | ESR(Ω) | ESL(nH) | ESR(Ω) | ESL(nH) | ESR(Ω) | ESL(nH) | Lmnt(nH) | | |
| 0.001 | 0.101 | 0.300 | 0.161 | 0.400 | 0.261 | 0.005 | 0.276 | 0.006 | 0.415 | 1.000 | 0.001 | 0.003 | 1.000 | | |
| 0.0022 | 0.100 | 0.300 | 0.115 | 0.400 | 0.186 | 0.005 | 0.179 | 0.006 | 0.269 | 1.000 | 0.001 | 0.003 | 1.000 | | |
| 0.0047 | 0.072 | 0.300 | 0.083 | 0.400 | 0.134 | 0.005 | 0.118 | 0.006 | 0.177 | 1.000 | 0.001 | 0.003 | 1.000 | | |
| 0.01 | 0.052 | 0.300 | 0.060 | 0.400 | 0.097 | 0.005 | 0.078 | 0.006 | 0.117 | 1.000 | 0.001 | 0.003 | 1.000 | | |
| 0.022 | 0.039 | 0.300 | 0.043 | 0.400 | 0.069 | 0.005 | 0.051 | 0.006 | 0.076 | 1.000 | 0.001 | 0.003 | 1.000 | | |
| 0.047 | 0.036 | 0.300 | 0.038 | 0.400 | 0.050 | 0.005 | 0.033 | 0.006 | 0.050 | 1.000 | 0.001 | 0.003 | 1.000 | | |
| 0.1 | 0.026 | 0.300 | 0.028 | 0.400 | 0.036 | 0.005 | 0.022 | 0.006 | 0.033 | 1.000 | 0.001 | 0.003 | 1.000 | | |
| 0.22 | 0.018 | 0.300 | 0.020 | 0.400 | 0.026 | 0.005 | 0.014 | 0.006 | 0.021 | 1.000 | 0.001 | 0.003 | 1.000 | | |
| 0.47 | 0.014 | 0.300 | 0.016 | 0.400 | 0.023 | 0.005 | 0.009 | 0.006 | 0.014 | 1.000 | 0.001 | 0.003 | 1.000 | | |
| 1 | 0.010 | 0.300 | 0.012 | 0.400 | 0.017 | 0.005 | 0.007 | 0.006 | 0.009 | 1.000 | 0.001 | 0.003 | 1.000 | | |
| 2.2 | 0.008 | 0.300 | 0.009 | 0.400 | 0.012 | 0.005 | 0.006 | 0.006 | 0.006 | 1.000 | 0.001 | 0.003 | 1.000 | | |
| 4.7 | 0.006 | 0.300 | 0.007 | 0.400 | 0.008 | 0.005 | 0.004 | 0.006 | 0.005 | 1.000 | 0.001 | 0.003 | 1.000 | | |
| User1 | 0.001 | 0.300 | 0.002 | 0.400 | 0.003 | 0.005 | 0.004 | 0.006 | 0.005 | 1.000 | 0.001 | 0.003 | 1.000 | | |
| User2 | 0.001 | 0.300 | 0.002 | 0.400 | 0.003 | 0.005 | 0.004 | 0.006 | 0.005 | 1.000 | 0.001 | 0.003 | 1.000 | | |
| User3 | 0.001 | 0.300 | 0.002 | 0.400 | 0.003 | 0.005 | 0.004 | 0.006 | 0.005 | 1.000 | 0.001 | 0.003 | 1.000 | | |
| User4 | 0.001 | 0.300 | 0.002 | 0.400 | 0.003 | 0.005 | 0.004 | 0.006 | 0.005 | 1.000 | 0.001 | 0.003 | 1.000 | | |

| Bulk Cap [uF] | Bulk | | | Custom | | |
|---|---|---|---|---|---|---|
| | ESR(Ω) | ESL(nH) | Lmnt(nH) | ESR(Ω) | ESL(nH) | mnt [nH] |
| 10 | 0.190 | 2.200 | 1.500 | 0.030 | 2.300 | 1.700 |
| 22 | 0.147 | 2.200 | 1.500 | 0.030 | 2.300 | 1.700 |
| 47 | 0.140 | 2.200 | 1.500 | 0.030 | 2.300 | 1.700 |
| 100 | 0.060 | 2.300 | 1.600 | 0.030 | 2.300 | 1.700 |
| 220 | 0.056 | 2.300 | 1.600 | 0.030 | 2.300 | 1.700 |
| 330 | 0.049 | 2.300 | 1.700 | 0.030 | 2.300 | 1.700 |
| 470 | 0.049 | 2.300 | 1.700 | 0.030 | 2.300 | 1.700 |
| User5 | 0.030 | 2.300 | 1.700 | 0.030 | 2.300 | 1.700 |
| User6 | 0.030 | 2.300 | 1.700 | 0.030 | 2.300 | 1.700 |

| BGA Via & Plane Cap | Custom | | |
|---|---|---|---|
| | ESR(Ω) | ELS [nH] | C [uF] |
| BGA Via | 0.0004 | 0.018 | N/A |
| Plane Cap | 0.015 | N/A | N/A |

| VRM | ESR(Ω) | ESL(nH) |
|---|---|---|
| Ignore | 1.0E+50 | 1.0E+50 |
| Linear | 0.001 | 10.00 |
| Switcher | 0.001 | 20.00 |
| Custom | 0.001 | 30.00 |

| Spreading R and L | Rs [Ω] | Ls [nH] |
|---|---|---|
| Ignore | 0 | 0 |
| Low | 0.0005 | 0.015 |
| Medium | 0.001 | 0.030 |
| High | 0.0015 | 0.045 |
| Custom | 0.002 | 0.020 |

| Dielectric Material | Er |
|---|---|
| FR4 | 4.00 |
| Nelco 4000-6 | 4.10 |
| Nelco 4000-13EPSI | 3.40 |
| Isola FR406 | 3.80 |
| Isola FR408 | 3.70 |
| Isola FR370HR | 4.04 |
| Getek | 3.60 |
| Rogers 4350B | 3.48 |
| Custom | 3.80 |

FIG. 3B

| CAP Mounting Inductance | Symbol | Unit | 0201 | | 0402 | | 0603 | | 0805 | | 1206 | |
|---|---|---|---|---|---|---|---|---|---|---|---|---|
| | | | VOS | VOE | VOS | VOE | VOS | VOE | VOS | VOE | VOS | VOE |
| Space between pads | Gap | mills | 11.8 | 11.8 | 19.6 | 19.6 | 31.5 | 31.5 | 47.2 | 47.2 | 78.7 | 78.7 |
| Width of pads | Width | mills | 9.8 | 9.8 | 15.7 | 15.7 | 23.6 | 23.6 | 39.4 | 39.4 | 47.2 | 47.2 |
| Pitch between traces | Pitch | mills | 30 | 31.5 | 36 | 55.1 | 44 | 78.7 | 60 | 98.4 | 67 | 157.5 |
| Metal thickness | t | mills | 0.6 | 0.6 | 0.6 | 0.6 | 0.6 | 0.6 | 0.6 | 0.6 | 0.6 | 0.6 |
| Height above reference plane | h | mills | 3.6 | 3.6 | 3.6 | 3.6 | 3.6 | 3.6 | 3.6 | 3.6 | 3.6 | 3.6 |
| Trace length | A | mills | 20 | 20 | 20 | 20 | 20 | 20 | 20 | 20 | 20 | 20 |
| Trace width | W | mills | 20 | 20 | 20 | 20 | 20 | 20 | 20 | 20 | 20 | 20 |
| Via radius (half of drill size) | r | mills | 5 | 5 | 5 | 5 | 5 | 5 | 5 | 5 | 5 | 5 |
| Via pitch | B | mills | 30 | 71.5 | 36 | 95.1 | 44 | 118.7 | 60 | 138.4 | 67 | 197.5 |
| Top via length | C1 | mills | 41.1 | 41.1 | 41.1 | 41.1 | 41.1 | 41.1 | 41.1 | 41.1 | 41.1 | 41.1 |
| Bottom via length | C2 | mills | 6 | 6 | 6 | 6 | 6 | 6 | 6 | 6 | 6 | 6 |
| Power plane dielectric thickness | thk | mills | 2.7 | 2.7 | 2.7 | 2.7 | 2.7 | 2.7 | 2.7 | 2.7 | 2.7 | 2.7 |
| Cap mounting inductance - Top | Ltop | nH | 1.35 | 1.72 | 1.38 | 1.89 | 1.44 | 2.00 | 1.53 | 1.98 | 1.60 | 2.25 |
| Cap mounting inductance - Bottom | Lbot | nH | 0.71 | 0.77 | 0.68 | 0.84 | 0.66 | 0.86 | 0.64 | 0.79 | 0.67 | 0.94 |

FIG. 4C

POWER DELIVERY NETWORK CALCULATOR TOOL FOR PRINTED CIRCUIT BOARD CAPACITORS

BACKGROUND

Power delivery network (PDN) design is critical for providing clean power to integrated circuits, such as field-programmable gate arrays (FPGAs) and other electronic devices. A high percentage of the area of a printed circuit board (PCB) and system board costs are dedicated to the several PDNs that are typically found on product PCBs. Optimization of printed circuit board designs strive to provide the cleanest power possible without over designing the PCB with extraneous decoupling capacitors, which are not effective and unnecessarily add cost. To achieve effective PCB designs during the early design phase without going through extensive pre-layout simulations, board designers must accurately estimate the number, the capacitor values, and the type of decoupling capacitors.

One type of decoupling capacitor tool simply calculates the impedance of the PDN as a parallel combination of many decoupling capacitors. This method of impedance calculation is sometimes called single node analysis because all the capacitors are in parallel and attached between a single power supply node and ground. Typical usage of single node analysis has been to choose a number of decoupling capacitors required to meet a target impedance up to an arbitrary frequency. A significant shortcoming of single node analysis is the lack of information regarding other sources contributing to the impedance of the power delivery network, such as the spreading inductance of the power and ground planes and the inability to judge how changes to the PCB configuration will affect the PDN impedance.

Another type of decoupling capacitor tool provides the extracted impedance of the PDN but does not give any guidance into the number of capacitors that may be effective or the limiting factors of the PCB that render the capacitors ineffective. This type of tool uses multi-node analysis, which is heavily computer-resource intensive. The usefulness of multi-node analysis is limited due to the requirement of having extensive post-layout information in order to get accurate results. In addition, the resource intensive nature of multi-node analysis prevents its use in instances where a designer desires to quickly investigate different options for PCB configurations.

It is in this context that embodiments of the invention arise.

SUMMARY

Broadly speaking, the present invention fills these needs by providing a method and apparatus for optimizing power distribution design of printed circuit boards. It should be appreciated that the present invention can be implemented in numerous ways, including as a method, a system, or a device. Several inventive embodiments of the present invention are described below.

In accordance with one aspect of the invention, a method of calculating a system power distribution network (PDN) impedance is detailed. The impedance calculation calculates the impedance as separate elements of the printed circuit board (PCB). An approximation of the power and ground via inductance of the printed circuit board is made based on the configuration of the printed circuit board. The decoupling capacitors of the PCB are modeled as a parallel combination of inductors, capacitors, and resistors, and the parallel combination is used to calculate the impedance. In addition to the impedance associated with the decoupling capacitors, the method calculates an inductance associated with a mounting orientation of the decoupling capacitors. The power and ground planes of the printed circuit board have an associated capacitance and inductance, which is calculated. The resultant simulated impedance profile illustrating the board configuration impedance over a frequency range is displayed.

In accordance with another aspect of the invention, a computer implemented system for designing a power delivery network with an optimum number of decoupling capacitors is provided. The computer implemented system includes processor connected to memory and a display through a bus. The memory contains a data library with input information and a number of modules for calculating the board impedance. The modules stored in memory includes a via impedance module, a spreading impedance module, a decoupling capacitor impedance module, and a mounting orientation impedance module. The processor receives instructions from the modules stored in memory which cause the processor to perform the board impedance calculation. The board impedance calculation includes approximating the inductance of the power and ground vias, calculating the spreading inductance of a power and ground planes of the PCB, and calculating an inductance associated with a mounting orientation of the plurality of decoupling capacitors. The display is configured to display the calculated board configuration impedance over a frequency range.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 3B illustrates an exemplary graphical interface to the data library in accordance with one embodiment of the present invention.

FIG. 4C illustrates an exemplary graphical interface to the mounting impedance module in accordance with one embodiment of the present invention.

DETAILED DESCRIPTION

The following embodiments describe an apparatus and method for pre-layout optimization of power distribution design of printed circuit boards. It will be obvious, however, to one skilled in the art, that the present invention may be practiced without some or all of these specific details. In other instances, well known process operations have not been described in detail in order not to unnecessarily obscure the present invention.

To achieve optimal performance from the power distribution network (PDN), the board designer requires pre-layout guidance on how many decoupling capacitors on a given printed circuit board (PCB) are effective and how design changes to the PCB enable effective use of additional decoupling capacitors. In one embodiment of the present invention described below, the PDN calculator tool determines the maximum number of effective decoupling capacitors as a function of key printed circuit board design parameters using non-intensive computing techniques based on a pre-layout PCB configuration. The PDN calculator tool provides the means to identify the series inductances and resistances associated with the PCB, as well as providing a number of PCB capacitors that are useful for decoupling power supply. In addition, the PDN calculator tool identifies a minimum impedance and maximum frequency that can be achieved given the characteristics of the printed circuit board.

Figure 1:
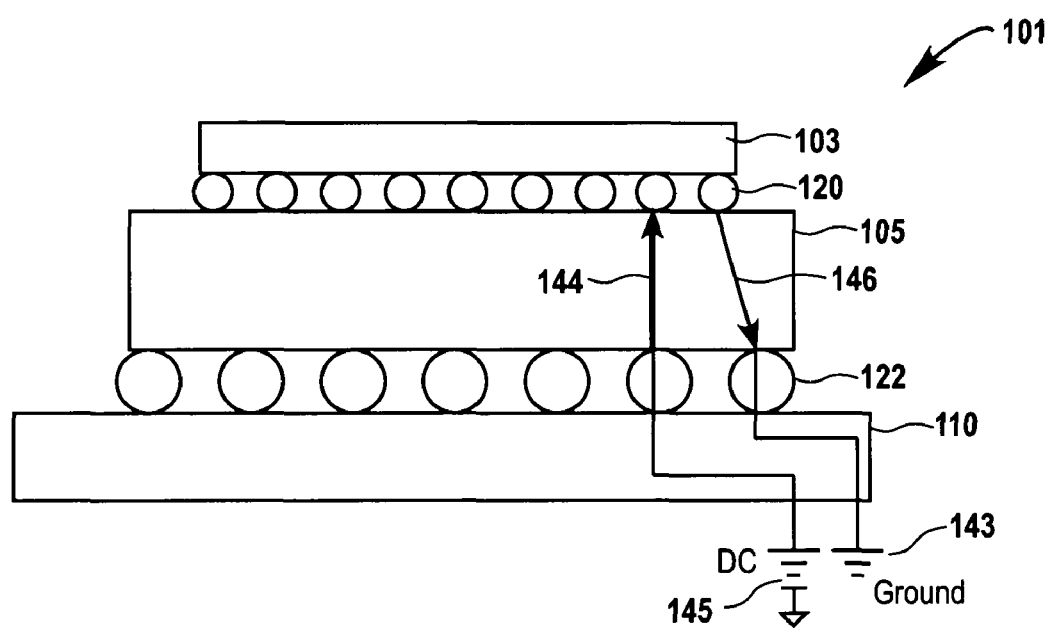
FIG. 1 illustrates a cross section of a system power distribution network in accordance with one embodiment of the present invention.

FIG. 1 illustrates a cross section of a system power distribution network in accordance with one embodiment of the present invention. The system PDN 101 includes an integrated circuit 103, a die package 105 for the integrated circuit 102, a printed circuit board 110, connection bumps 120, and ball grid array (BGA) bumps 122. Integrated circuit 103 is a semiconductor chip, such as a microprocessor, field programmable gate arrays (FPGAs), application specific integrated circuits (ASICs), flash memories, and complex programmable logic devices (CPLDs). The die package 105 provides communication between the integrated circuit 103 and the printed circuit board 110 through chip connection bumps 120 and the solder balls 122, which is part of a ball grid array. In one embodiment, a DC power supply 145 and a ground 143 are provided to the integrated circuit 103 through the PCB 110. The DC power supply 145 provides a supply voltage to the integrated circuit 103 to activate a device (not shown) on the integrated circuit 103 through a power path 144. The electric flow generated by the activated device on the integrated circuit 103 is grounded through a return path 146.

Figure 2:
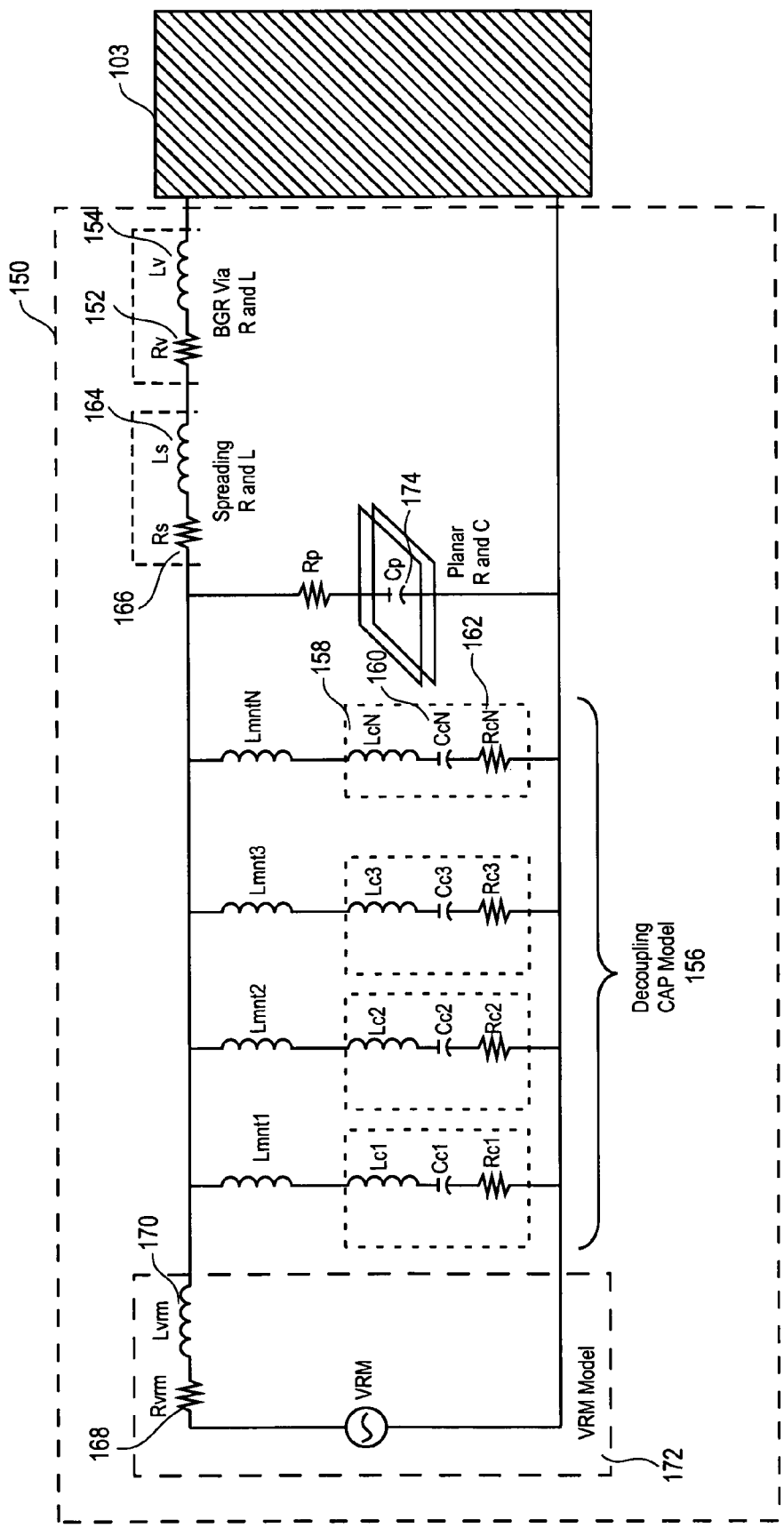
FIG. 2 illustrates a power delivery circuit topology for board impedance estimation in accordance with one embodiment of the present invention.

FIG. 2 illustrates a power delivery circuit topology for board impedance estimation in accordance with one embodiment of the present invention. In a first order approximation, the power delivery network 150 to the integrated circuit 103 can be modeled by a network of discrete impedance elements. The impedance associated with the power and ground vias can be modeled as a series combination of a lumped inductor 154 and resistor 152. In similar fashion, the spreading impedance of power and ground planes of the PCB can be modeled as a series combination of a lumped inductor 164 and resistor 166. The decoupling capacitors 156 of the printed circuit board can be modeled as a parallel combination of intrinsic impedances associated with each of the decoupling capacitors 156. The intrinsic impedance of the decoupling capacitors 156 can be modeled as a series combination of a resistor 162, a capacitor 160, and an inductor 158.

The voltage regulator module (VRM) 172 of the printed circuit board can be modeled as a series connected resistor 168 and capacitor 170. At low frequencies, up to approximately 50 kHz, the VRM 172 has low impedance and is capable of responding to the instantaneous current requirements of the integrated circuit 103.

Above low frequencies, i.e. greater than 50 kHz, the VRM 172 impedance is primarily inductive, making it incapable of meeting the transient current requirements of the integrated circuit 103. The decoupling capacitors 156 on the PCB must provide the required low impedance above about 50 kHz. The impedance characteristics of the decoupling capacitors 156 are determined by the intrinsic parasitics of the decoupling capacitors 156, as well as an inductance associated with mounting the decoupling capacitors 156 to the PCB. The interplanar capacitance 174 between the power plane and the ground plane of the printed circuit board typically has a lower inductance than the network of decoupling capacitors 156 thereby making the capacitance between the power and the ground planes more effective at higher frequencies.

Figure 3:
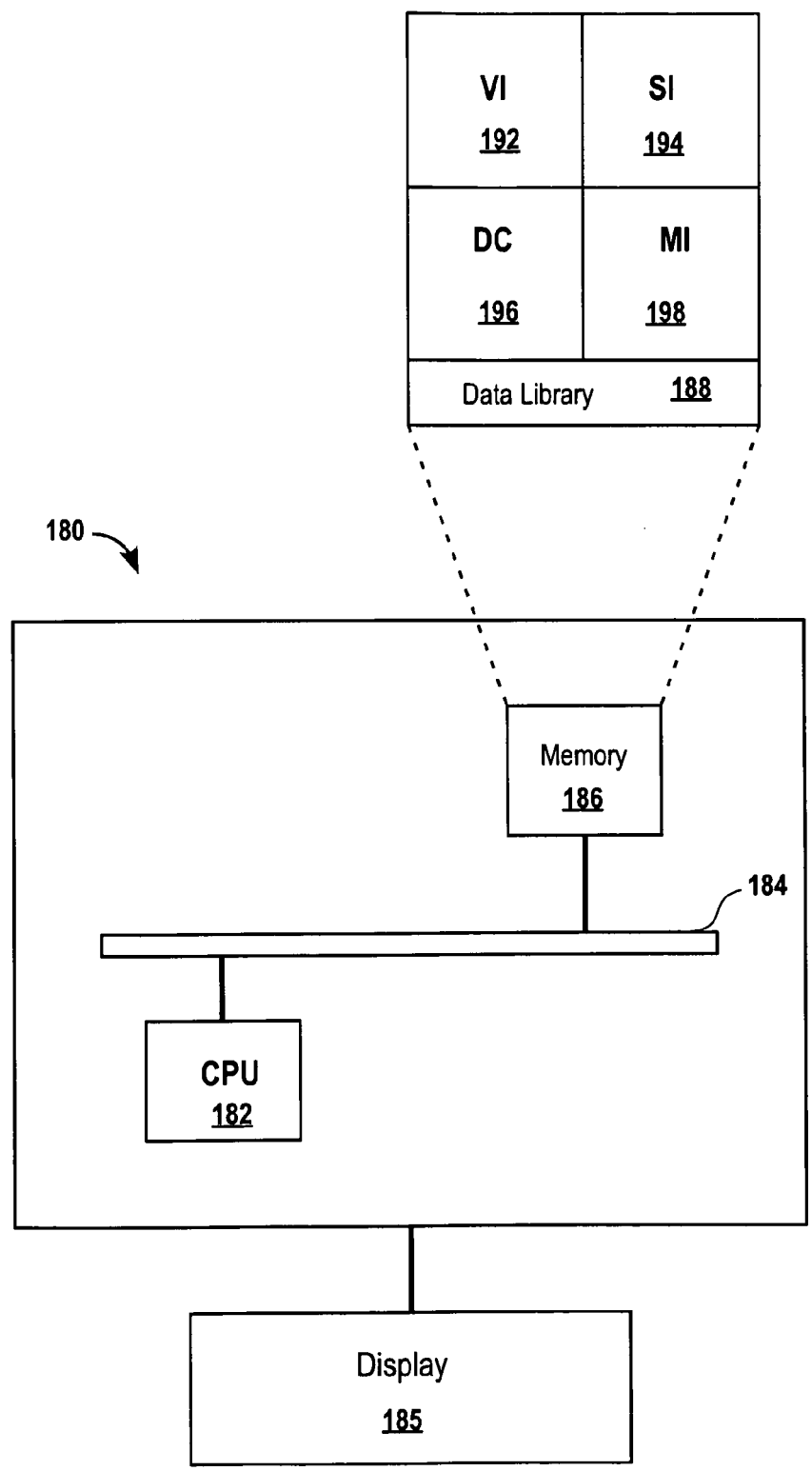
FIG. 3 illustrates a computer implemented system for designing a power delivery network with an optimum number of decoupling capacitors in accordance with one embodiment of the present invention.

FIG. 3 illustrates a computer implemented system for designing a power delivery network with an optimum number of decoupling capacitors in accordance with one embodiment of the present invention. The computer system 180 includes a central processing unit (CPU) 182, which is coupled through bus 184 to memory 186. It should be appreciated that the memory 186 may be embodied as random access memory (RAM) or a mass storage device. Furthermore, the mass storage device may represent a persistent data storage device such as a floppy disc drive or a fixed disc drive, which may be local or remote. It should also be appreciated that CPU 182 may be embodied in a general-purpose processor, a special purpose processor, or a specially programmed logic device. Display 185 is in communication with CPU 182, and memory 186, through bus 184. The display 185 is configured to display a board configuration impedance over a frequency range described herein.

Figure 3A:
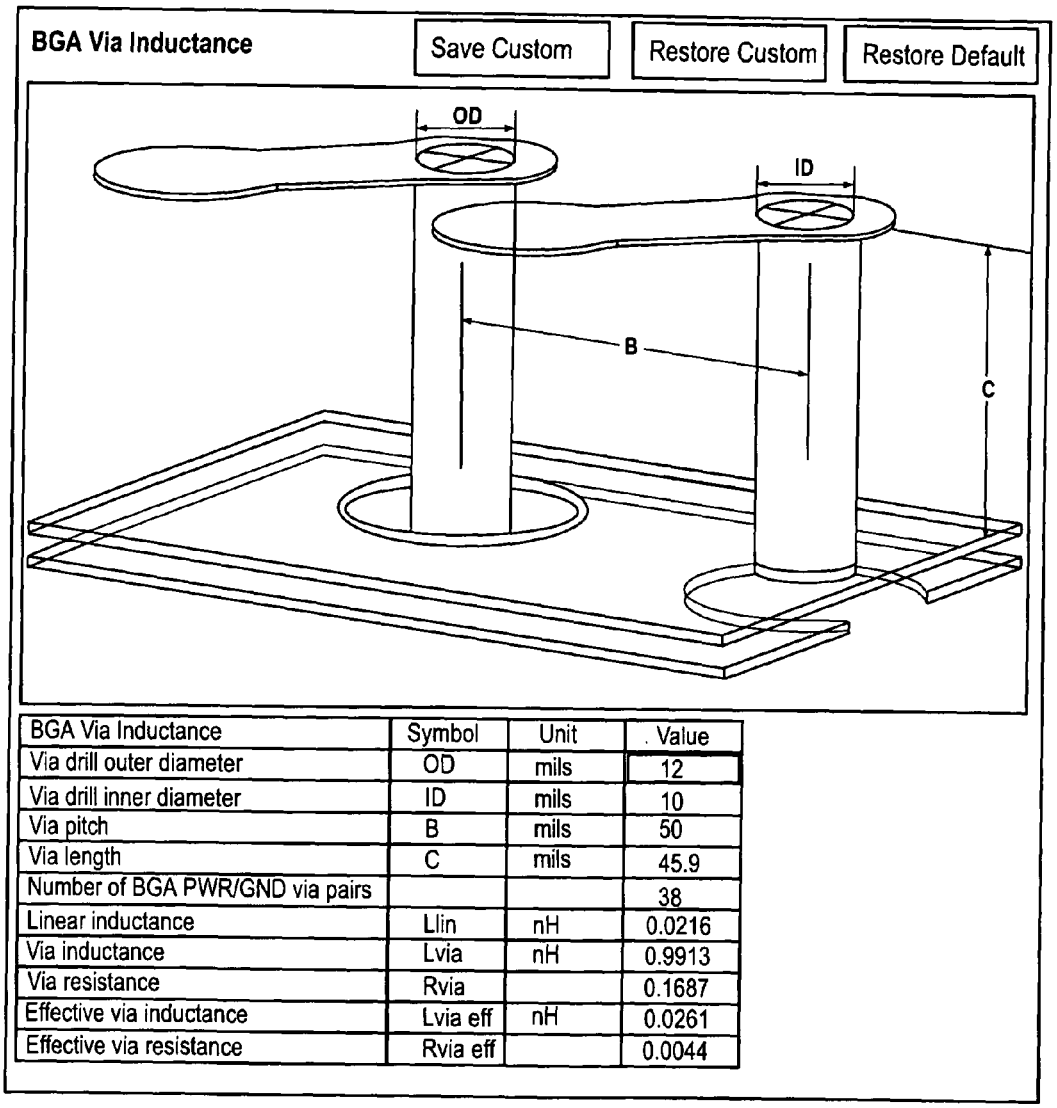
FIG. 3A illustrates an exemplary graphical interface to the via inductance module in accordance with one embodiment of the present invention.

Memory 186 is configured to include a data library 188 which contains input information, and a plurality of modules. The modules include a via impedance module 192, a spreading impedance module 194, a decoupling capacitor impedance module 196, and a mounting orientation impedance module 198. The via inductance module 192 approximates the via loop inductance arising from the BGA vias underneath the integrated circuit. In one embodiment, the via inductance module 192 receives layout information including via drill diameter, via length, via pitch, and number of power/ground via pairs under the integrated circuit to calculate an effective value of the BGA parasitic inductance and resistance. FIG. 3A illustrates an exemplary graphical interface to the via inductance module in accordance with one embodiment of the present invention. The exemplary via inductance graphical interface contains a top region with buttons allowing the PCB designer to control the use of custom values of via parameters to be used by the via inductance module. The exemplary graphical interface to the via inductance module may further include a graphic portion illustrating the values of the via pitch, via outer and inner drill diameters, and via length required by the via inductance module. In addition, the exemplary via inductance graphical interface may include a text portion containing the input values of the via parameters as well as the calculated impedance values.

Referring to FIG. 2, the decoupling capacitor impedance module 196 calculates the impedance of the decoupling capacitors, which is modeled as parallel combination of intrinsic impedances associated with each of the decoupling capacitors. The data library 188 contains values of the intrinsic resistances and inductances of a number of decoupling capacitors. FIG. 3B illustrates an exemplary graphical interface to the data library in accordance with one embodiment of the present invention. The exemplary data library graphical interface contains a top region with buttons allowing the PCB designer to control the use of custom values of capacitance and inductance to be used by various modules. In addition, the exemplary graphical interface to the data library contains several text regions containing typical values for the parasitics of a number of decoupling capacitors and bulk capacitors, as well as, dielectric constants for different dielectrics. Values for the parasitics may come directly from the vendors providing the decoupling capacitors through a specification sheet or customized by the designer. The text regions of the exemplary graphical interface provide a PCB designer the capability to change any of the capacitance or inductance values used by the various modules.

The spreading impedance module 194 performs calculations of the horizontal inductance of PCB power and ground planes. The spreading impedance is the impedance seen from integrated circuit to the decoupling capacitors through the power and ground planes of the printed circuit board. The power and ground planes of the PCB have an associated inductance, which can be calculated by the dimensions of the power and ground planes measured in squares. As is known in the art, the number of squares of a plane can be calculated by dividing the length of the plane by the width of the plane. In one embodiment, the spreading impedance module 194 adjusts the inductance calculation of the ground and power planes based on assumptions of the PCB stack profile, the proximity of the decoupling capacitors to the integrated circuit, and the number of via perforations in the power and ground planes. For example, a PCB stack profile with wide power and ground planes separated by a thin dielectric minimizes the loop current and the associated inductance.

Figure 4B:
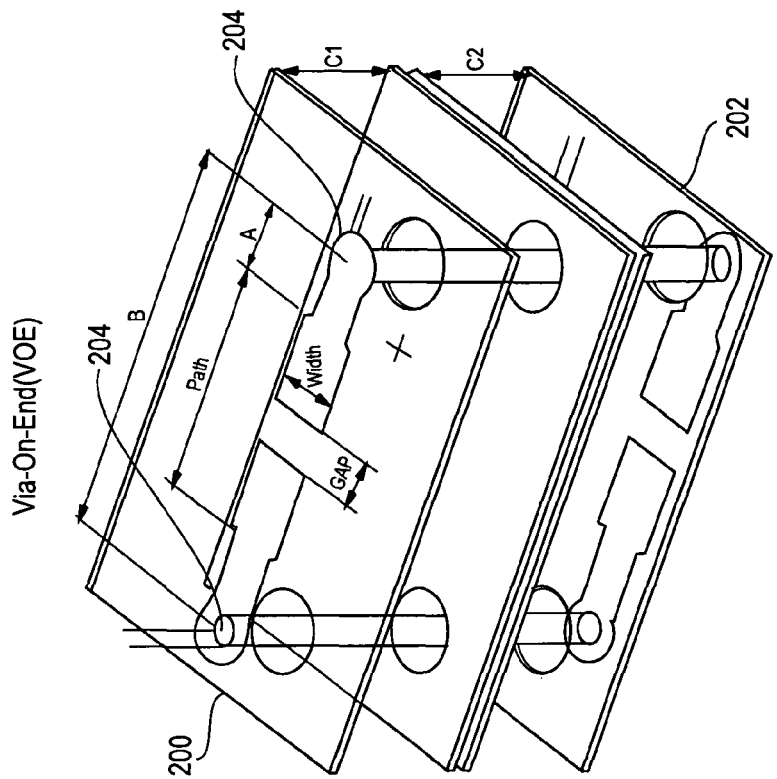
FIG. 4B illustrates a via-on-end mounting configuration in accordance with one embodiment of the present invention.
Figure 4A:
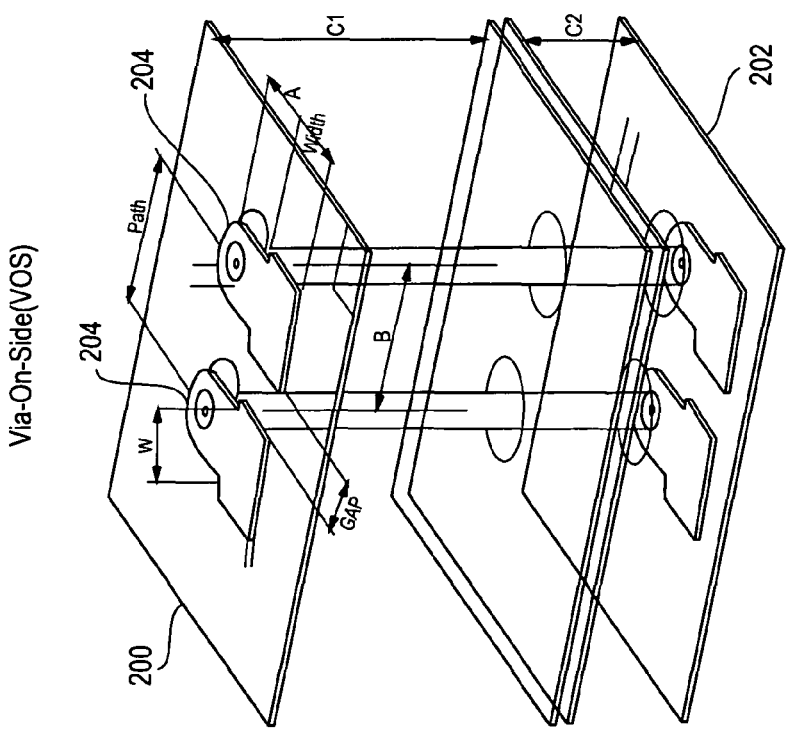
FIG. 4A illustrates a via-on-side decoupling capacitor mounting configuration in accordance with one embodiment of the present invention.

Referring to FIG. 3, the mounting impedance module 198 calculates the inductance associated with a mounting orientation of the plurality of decoupling capacitors. The inductance associated with mounting the decoupling capacitors to the printed circuit board is a significant factor contributing to the impedance behavior of the PCB at high frequencies. The decoupling capacitors are assumed to be mounted on either the top 200 or bottom layer 202 of the PCB, as illustrated in FIGS. 4A and 4B. The mounting inductance of the decoupling capacitors is affected by the mounting orientation of the decoupling capacitors. FIG. 4A illustrates a via-on-side decoupling capacitor mounting configuration in accordance with one embodiment of the present invention. In the via-on-side (VOS) mounting configuration, the decoupling capacitors are mounted to the power and ground vias 204 through a connection on the side of the via 204.

FIG. 4B illustrates a via-on-end mounting configuration in accordance with one embodiment of the present invention. In the via-on-end (VOE) mounting configuration the decoupling capacitors are mounting on the end of the power and ground vias 204. In one embodiment, the mounting impedance module provides the decoupling capacitor mounting capacitance for both the VOE and VOS mounting configuration and for decoupling capacitors mounted on the top or the bottom of the PCB. In another embodiment, the calculated mounting inductance is adjusted based on the footprint or area taken up by the decoupling capacitor. The contribution of the inductance due to mounting inductance of the decoupling capacitors is modified depending on which mounting orientation is selected.

FIG. 4C illustrates an exemplary graphical interface to the mounting impedance module in accordance with one embodiment of the present invention. The exemplary mounting impedance graphical interface contains a top region with buttons allowing the PCB designer to control the use of custom values of via parameters to be used by the mounting impedance module. The exemplary graphical interface for the mounting impedance module may have a graphic portion illustrating the values of the via parameters used by the mounting impedance module. A designer may make changes to a parameter value in the text portion of the graphical interface, e.g. via pitch, and the calculated mounting inductance will reflect the change in impedance in real-time due to the change in parameter value.

Figure 5:
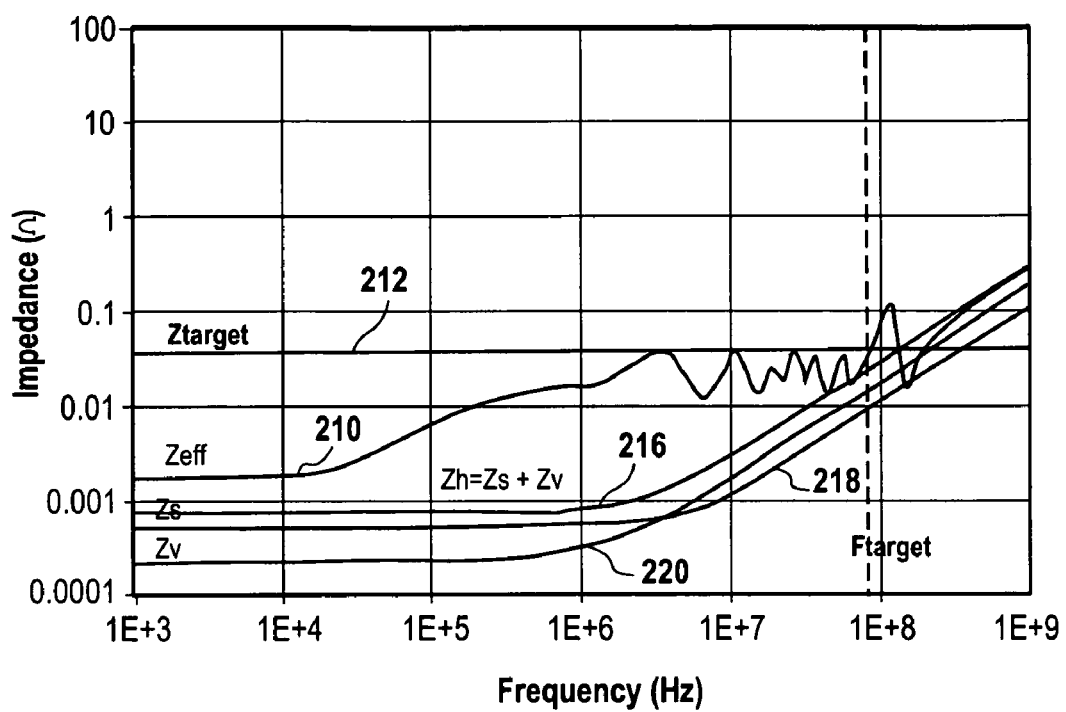
FIG. 5 illustrates a calculation of the board impedance over a frequency range in accordance with one embodiment of the present invention.

Referring to FIG. 3, by using the impedance calculations from the modules stored in memory, the board impedance can be calculated for a given printed circuit board configuration. FIG. 5 illustrates a calculation of the board impedance over a frequency range in accordance with one embodiment of the present invention. A designer can provide a number of parameters to define possible PCB configurations and the PDN calculator tool will calculate the effective board impedance 210 based on the board configuration.

In one embodiment, in addition to the calculated board impedance 212, a target impedance 212 based on a specified maximum transient current of the power plane and a specified maximum alternating current (AC) ripple as a percentage of a power supply voltage is calculated. The target impedance 212 can be written as:

$$Z_{Target} = \frac{VoltageRail \times \frac{\% \ ripple}{100}}{MaxTransisentCurrent} \quad (1)$$

By comparing the target impedance 212 to the calculated board impedance 210, a designer can evaluate if the PCB configuration under consideration meets the desired target impedance requirement up to the specified target frequency 214.

The PDN calculator tool further displays a simulated board inductance limitation line 216, where the simulated board inductance limitation line 216 is determined by the series combination of the BGA via inductance and the spreading inductance of the power plane. This board inductance limitation line 216 corresponds to a physical lower bound on the impedance where adding additional decoupling capacitors fails to be effective for decoupling purposes. In another embodiment, the PDN calculator tool separately calculates the spreading inductance 218 associated with the PCB power and ground planes, and vertical inductance 220 of the BGA vias. By calculating the individual inductive components, a designer can better comprehend which specific elements of the PCB is the limiting source of inductance and pinpoint areas to make corrections to the PCB configuration. For instance, a designer might choose to adjust some of the parameters associated with the BGA vias, such as the via drill diameter, via length, via pitch, or number of power/ground via pairs under the integrated circuit to lower the BGA via inductance 220, as well as the board inductance limitation line 216.

Figure 5A:
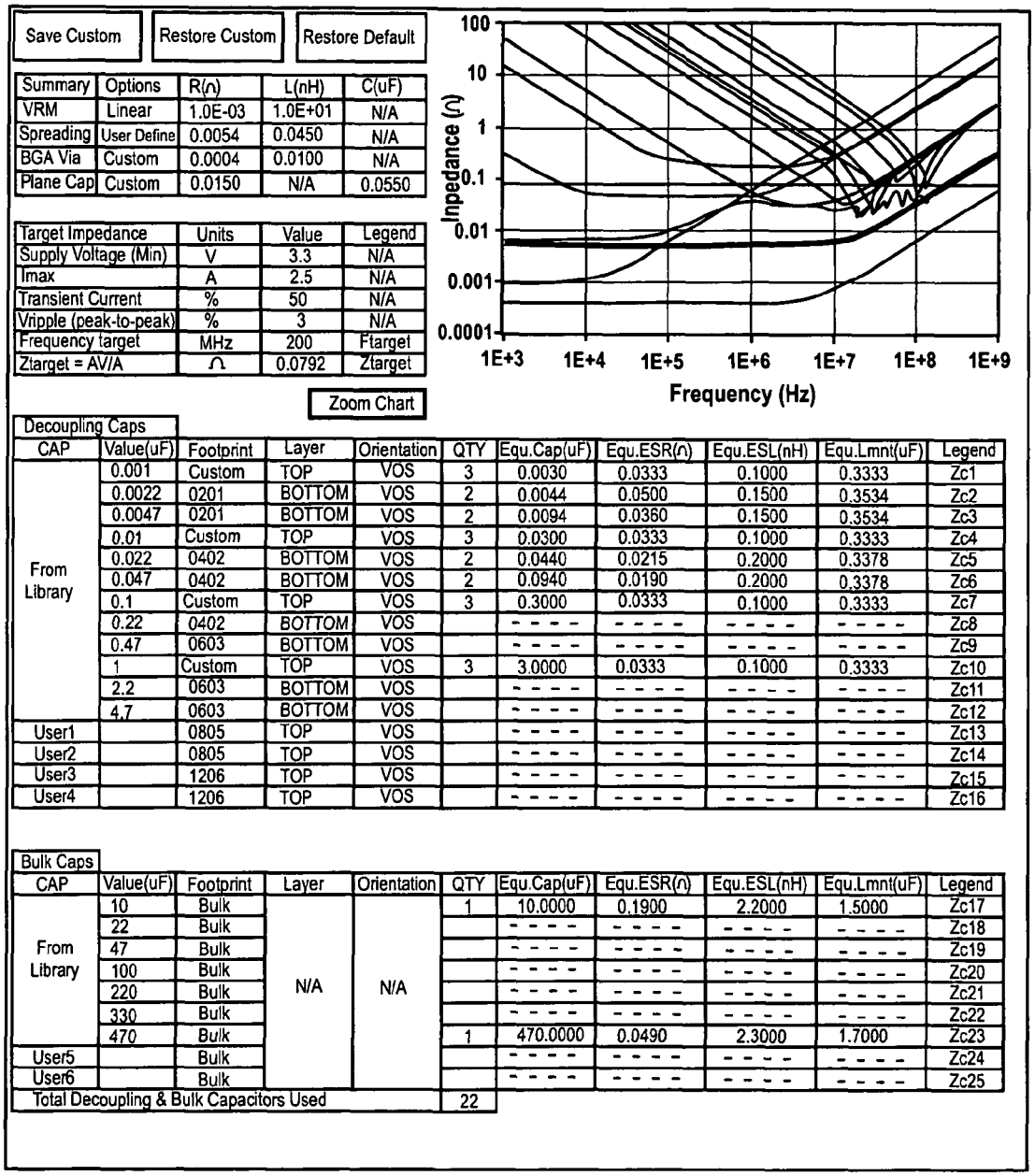
FIG. 5A illustrates an exemplary graphical interface to the PDN calculator tool in accordance with one embodiment of the present invention.

FIG. 5A illustrates an exemplary graphical interface to the PDN calculator tool in accordance with one embodiment of the present invention. The exemplary PDN calculator tool interface contains a top region with buttons allowing the PCB designer to control the use of a custom setup to the PDN calculator tool and a graphic portion showing the simulated board configuration impedance as a function of frequency, as well as the simulated board inductance limitation line, the target frequency, the BGA via inductance, and the spreading inductance. The exemplary graphical interface to the PDN calculator tool may further include text portions, which allow a designer to input or modify the PCB configuration. In one example, if the simulated board inductance limitation line is above the target impedance at the target frequency, this indicates adding additional decoupling capacitors to the PCB configuration will fail to provide an effective impedance that will meet the target impedance at the target frequency. In the case where the board inductance limitation line is lower than the target impedance, the designer can add decoupling capacitors to the PCB configuration through the text portion of the PDN calculator tool graphical interface to meet the desired target impedance.

Figure 6:
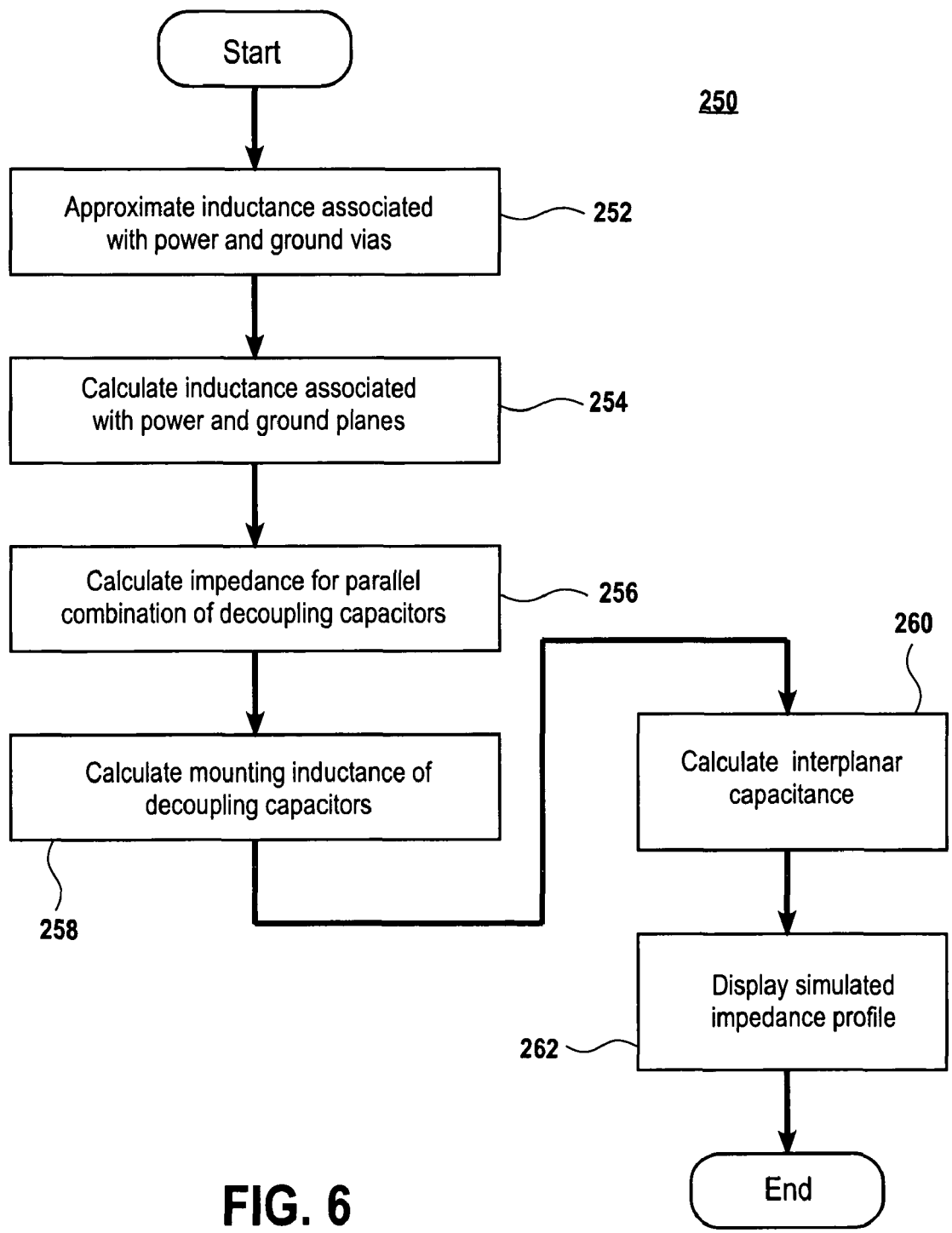
FIG. 6 is a flow chart diagram illustrating method operations for estimating the system power distribution network impedance as a function of frequency of a power delivery network in accordance with one embodiment of the present invention.

FIG. 6 is a flow chart diagram illustrating method operations for estimating the system power distribution network impedance as a function of frequency of a power delivery network in accordance with one embodiment of the present invention. The method 250 begins with operation 252, where the inductance associated with the power and ground vias is approximated. As illustrated in FIG. 2, the inductance of the BGA vias can modeled as a lumped inductor. The method then proceeds to operation 254, where the spreading inductance associated with the power and ground planes is calculated. The calculated value of the spreading inductance is adjusted depending on the design rules that are assumed to be used in the design of the printed circuit board.

In one embodiment, some design rule elements are: the stack profile of the PCB, the placement of the decoupling capacitors relative to the integrated circuit, and the number of via perforations in the power and ground planes in the current path from the decoupling capacitors to the integrated circuit. For example, the thickness of dielectric between the power and ground planes has a direct influence on the spreading inductance. In another example, placing the decoupling capacitors closer to the integrated circuit reduces the current path, leading to reduced inductance.

In operation 256, the impedance of the parallel combination of a plurality of capacitors is calculated. Referring to FIG. 3, data for the parasitics of a number of decoupling capacitors are stored in the data library and used to calculate the impedance of the decoupling capacitors. The method then advances to operation 258, where the inductance associated with a mounting orientation of the decoupling capacitors is calculated. As illustrated in FIGS. 4A and 4B, the decoupling capacitors are mounted to the PCB using either a via-on-side or via-on-end mounting orientation and the inductance is calculated taking into account the mounting orientation. In operation 260, the capacitance between a power plane and a ground plane of the printed circuit board is calculated. The data library illustrated in FIG. 3, stores the dielectric constants for a number of dielectric materials which are used to calculate the interplanar capacitance.

In operation 262, the simulated impedance profile illustrating a board configuration impedance over a frequency range is displayed. In one embodiment, the PDN calculator may additionally provide a simulated board inductance limitation line, a target impedance, and a specified target frequency to provide a designer with detailed information of the performance of the PCB board, as illustrated in FIG. 5. In another embodiment, the PDN calculator recalculates the simulated impedance profile after the PCB configuration is modified. In yet another embodiment, during the pre-layout phase of the printed circuit board design, the PDN calculator can be used to explore the solution space before finalizing key design parameters, such as the PCB stack profile, the size of the power and ground planes, the number of decoupling capacitors, and the decoupling capacitor mounting orientation. In one example, a designer can adjust the PCB configuration to explore in real-time the effect changing the thickness of the dielectric between the power and ground planes of the PCB has on the spreading inductance. In another example, a designer can add additional decoupling capacitors to a pre-layout PCB configuration and investigate how much affect each additional decoupling capacitor has on the reducing the system impedance profile.

Figure 7:
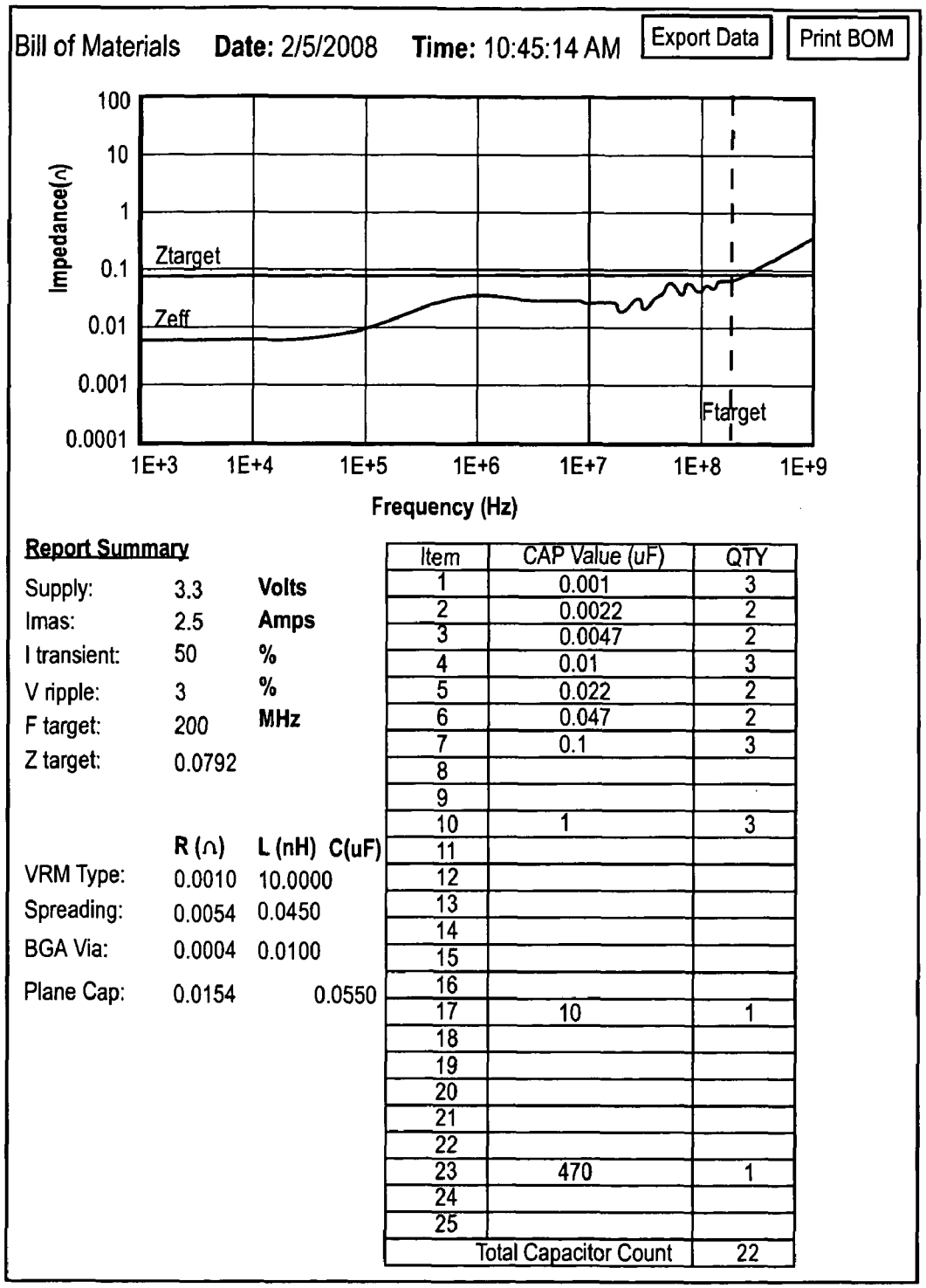
FIG. 7 illustrates an exemplary display of the bill of materials in accordance with one embodiment of the present invention.

FIG. 7 illustrates an exemplary display of the bill of materials in accordance with one embodiment of the present invention. The top portion of the exemplary bill of materials display may contain buttons allowing the PCB configuration information to be exported to a data file or printed out. A graphic portion of the exemplary bill of materials display may show the simulated board configuration impedance over a frequency range, as well as target impedance and target frequency. The exemplary bill of materials display may contain text portions, which summarize the key input parameters and calculated results from the PDN calculator tool. In addition, the text portions of the exemplary bill of materials display may present the PCB designer with a list of components corresponding to the simulated PCB configuration. One skilled in the art will appreciate that entering data, clicking buttons, or performing other operations on the exemplary graphical interfaces will initiate the board impedance calculations described above.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

The method and apparatus described herein may be incorporated into any suitable circuit, including processors and programmable logic devices (PLDs). The PLDs can include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the PLDs owned by ALTERA CORPORATION.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method calculating a system power distribution network impedance, comprising:
    approximating an inductance associated with a plurality of power and ground vias;
    calculating an impedance for a parallel combination of a plurality of capacitors;
    calculating an inductance associated with a selected mounting orientation of the plurality of capacitors, the selected mounting orientation including one of a via on side mounting orientation or a via on end mounting orientation inputting a target frequency for effective decoupling of a power delivery network;
    displaying a simulated board inductance limitation line, wherein the simulated board inductance limitation line is determined by the inductance of the plurality of vias and the calculated inductance of the power plane; and
    displaying a simulated impedance profile illustrating a board configuration impedance over a frequency range with the selected mounting orientation, wherein at least one method operation is executed through a processor.

2. The method of impedance calculation of claim 1, further comprising:
    calculating an inductance of a power plane of a printed circuit board; and
    adjusting the calculated inductance of the power plane based on a stack profile of the printed circuit board.

3. The method of impedance calculation of claim 1, further comprising:
    adjusting the inductance associated with the plurality of vias based on a plurality of via characteristics and a number of vias.

4. The method of impedance calculation of claim 1, further comprising:
    calculating a capacitance between a power plane and a ground plane of the printed circuit board.

5. The method of impedance calculation of claim 1, further comprising:
    modifying the selected mounting orientation of the plurality of capacitors; and
    recalculating the simulated impedance profile.

6. The method of impedance calculation of claim 1, further comprising:
    calculating a target impedance based on a maximum transient current of the power plane and a maximum ripple as a percentage of a power supply voltage.

7. The method of impedance calculation of claim 1, further comprising:
    modeling the inductance associated with the plurality of power and ground vias as a lumped inductor.

8. A non-transitory computer storage medium having program instructions for calculating the impedance of a power delivery network of a printed circuit board, comprising:
    program instructions for approximating an inductance of vias coupling to either a power plane or a ground plane of the printed circuit board;
    program instructions for calculating a spreading inductance of a power plane of the printed circuit board;
    program instructions for calculating an impedance for a parallel combination of a plurality of decoupling capacitors;
    program instructions for calculating a decoupling capacitor mounting inductance of the printed circuit board, the calculated capacitor mounting inductance based on either a via on side orientation or via on end orientation of the plurality of decoupling capacitors program instructions for inputting a target frequency for effective decoupling of a power delivery network;
    program instructions for displaying a simulated board inductance limitation line, wherein the simulated board inductance limitation line is determined by the inductance of the plurality of vias and the calculated inductance of the power plane; and
    program instructions for displaying the simulated board configuration impedance based on one of the via on side orientation or the via on end orientation as a function of frequency.

9. The computer storage medium of claim 8, further comprising:
    program instructions for modeling the spreading inductance of the power plane as a lumped inductor.

10. The computer storage medium of claim 8, further comprising:
    program instructions for calculating a maximum frequency associated with a printed circuit board design.

11. The computer storage medium of claim 8, further comprising:
    program instructions for determining an optimal number of capacitors required to achieve a target impedance.

12. The computer storage medium of claim 8, wherein the calculating the spreading inductance of a power plane further comprises:
    program instructions for receiving a set of pre-layout dimensions of the power plane and the ground plane.

13. The computer storage medium of claim 8, further comprising:
    program instructions for calculating an interplanar capacitance between the power plane and the ground plane of the printed circuit board.

14. A computer implemented system for designing a power delivery network with an optimum number of decoupling capacitors, comprising:
    a bus;
    a memory, the memory including a data library containing input information, and a plurality of modules, the plurality of modules including a via impedance module, a spreading impedance module, a decoupling capacitor impedance module, a mounting orientation impedance module;
    a display configured to display a board configuration impedance over a frequency range; and
    a processor in communication with the memory and the monitor through the bus, the processor operable to receive instructions from the plurality of modules which, when executed by the processor, cause the processor to perform a method comprising:
        approximating an inductance of a plurality of power and ground vias;
        calculating a spreading inductance associated with a power plane;
        calculating an inductance associated with a mounting orientation of the plurality of decoupling capacitors, the mounting orientation of the plurality of decoupling capacitors is one of a via on side mounting orientation or a via on end mounting orientation;
    inputting a target frequency for effective decoupling of a power delivery network;
    displaying the board configuration impedance over the frequency range based on the mounting orientation; and
    displaying a simulated board inductance limitation line, wherein the simulated board inductance limitation line is determined by the inductance of the plurality of vias and the calculated inductance of the power plane.

15. The computer implemented system of claim 14, the memory further comprising:
    a board inductance module, wherein the board induction module causes the processor to calculate a simulated board inductance limitation line determined by the approximated inductance of the plurality of vias and the calculated spreading inductance of the power plane.

16. The computing system of claim 14, wherein the inductance associated with the mounting orientation of the plurality of decoupling capacitors is adjusted based on adjusting the mounting orientation of the plurality of decoupling capacitors.

17. The computing system of claim 14, wherein the spreading inductance of the power plane is calculated using a pre-layout number of squares of the power plane.

* * * * *